(12) United States Patent
Fan et al.

(10) Patent No.: US 10,061,761 B2
(45) Date of Patent: Aug. 28, 2018

(54) REAL-TIME DYNAMIC VISUAL AID IMPLEMENTATION BASED ON CONTEXT OBTAINED FROM HETEROGENEOUS SOURCES

(71) Applicant: International Business Machines Corporation, Armonk, NY (US)

(72) Inventors: Si Bin Fan, Beijing (CN); Yu Gu, Cedar Park, TX (US); Su Liu, Austin, TX (US); Cheng Xu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/217,849

(22) Filed: Jul. 22, 2016

(65) Prior Publication Data
US 2018/0024982 A1  Jan. 25, 2018

(51) Int. Cl.
*G06F 17/00* (2006.01)
*G06F 17/24* (2006.01)
(Continued)

(52) U.S. Cl.
CPC .......... *G06F 17/248* (2013.01); *G06F 9/451* (2018.02); *G06F 17/30017* (2013.01);
(Continued)

(58) Field of Classification Search
CPC ......... G06F 17/30017; G06F 17/30598; G06F 2201/84
See application file for complete search history.

(56) References Cited

U.S. PATENT DOCUMENTS 5,608,859 A * 3/1997 Taguchi ............ G06F 17/30017
707/E17.009
5,664,227 A * 9/1997 Mauldin ........... G06F 17/30796
707/E17.028
(Continued)

FOREIGN PATENT DOCUMENTS

JP   2007133033 A   5/2007
WO  2015080718 A1  6/2015

OTHER PUBLICATIONS

Bergstrom et al., "Conversation Clusters: Grouping Conversation Topics through Human-Computer Dialog," CHI 2009, Apr. 2009, ACM., pp. 1-4.
(Continued)

*Primary Examiner* — Laurie A Ries
(74) *Attorney, Agent, or Firm* — Zilka-Kotab, P.C.

(57) ABSTRACT

In one embodiment, a computer-implemented method includes extracting one or more keywords from summarized content according to one or more classified topics. The method also includes searching for visual aid elements that relate to the one or more keywords in a visual aid element repository that stores a plurality of visual aid elements. In addition, the method includes selecting one or more visual aid elements from the visual aid element repository based on a type of the one or more classified topics. Also, the method includes generating at least one visual aid object using the one or more visual aid elements based on at least one predefined visual aid template. Moreover, the method includes delivering the at least one visual aid object to one or more registered devices of at least one user.

20 Claims, 7 Drawing Sheets

(51) Int. Cl.
*G06F 17/30* (2006.01)
*H04N 21/81* (2011.01)
*H04L 29/06* (2006.01)
*G06F 9/451* (2018.01)

(52) U.S. Cl.
CPC .. *G06F 17/30705* (2013.01); *G06F 17/30719* (2013.01); *H04L 65/4076* (2013.01); *H04N 21/8133* (2013.01)

(56) References Cited

U.S. PATENT DOCUMENTS

| | | | | |
|---|---|---|---|---|
| 7,284,204 | B2* | 10/2007 | Lee | G06Q 30/02 715/764 |
| 7,530,020 | B2* | 5/2009 | Szabo | G06F 17/30067 707/999.003 |
| 7,532,943 | B2* | 5/2009 | Weare | G06F 17/30017 700/94 |
| 7,574,659 | B2* | 8/2009 | Szabo | G06F 17/30067 705/14.69 |
| 7,668,885 | B2* | 2/2010 | Wittke | G06N 5/00 707/705 |
| 7,672,845 | B2* | 3/2010 | Beranek | 379/265.09 |
| 7,716,054 | B2* | 5/2010 | Harris | G06F 17/30743 704/253 |
| 8,131,779 | B2* | 3/2012 | Jonker | G06F 17/30017 707/811 |
| 8,391,618 | B1* | 3/2013 | Chuang | G06F 17/30247 382/224 |
| 8,555,167 | B2* | 10/2013 | Friedlander | H04N 5/44513 715/719 |
| 9,251,796 | B2* | 2/2016 | Wang | G06F 17/30861 |
| 9,552,399 | B1* | 1/2017 | Browning | G06F 17/30554 |
| 9,576,046 | B2* | 2/2017 | Bullotta | G06F 17/30864 |
| 2003/0200192 | A1* | 10/2003 | Bell | G06F 17/3087 |
| 2004/0059705 | A1* | 3/2004 | Wittke | G06N 5/00 |
| 2007/0033528 | A1* | 2/2007 | Merril | G02B 26/0816 715/732 |
| 2008/0082922 | A1* | 4/2008 | Biniak | H04N 7/17318 715/719 |
| 2008/0300872 | A1* | 12/2008 | Basu | G06F 17/30017 704/235 |
| 2009/0207252 | A1* | 8/2009 | Raghunath | H04N 5/782 348/158 |
| 2011/0029862 | A1* | 2/2011 | Scott | G06F 3/0237 715/261 |
| 2012/0046770 | A1* | 2/2012 | Becker | H04L 65/4084 700/94 |
| 2013/0238649 | A1* | 9/2013 | Shum | G06F 17/30292 707/758 |
| 2014/0089967 | A1* | 3/2014 | Mandalia | H04N 21/235 725/34 |
| 2014/0201203 | A1* | 7/2014 | Krishna | G06F 17/30528 707/729 |
| 2014/0282219 | A1* | 9/2014 | Haddock | G06F 17/30731 715/781 |
| 2015/0046832 | A1* | 2/2015 | George | G06F 17/3089 715/744 |
| 2015/0254330 | A1* | 9/2015 | Chan | G06F 17/30598 707/613 |
| 2015/0356593 | A1* | 12/2015 | Chawla | H04W 4/025 705/14.4 |
| 2016/0283494 | A1* | 9/2016 | Krishnaswamy | G06F 17/30663 |
| 2017/0344656 | A1* | 11/2017 | Koren | G06F 3/0484 |

OTHER PUBLICATIONS

Kim et al., "Enhancing Situation Awareness with Visual Aids on Cognitively-Inspired Agent Systems," Proc. Of the 3rd Int'l. Conf. on Applied Human Factors and Ergonomics AHFE 2010, pp. 1-8.
Krstajic et al., "Visual Analysis of News Streams with Article Threads," StreamKDD'10, Jul. 2010, pp. 39-46.
Huynh et al., "Social Media Analysis for Disaster Management," Fachstudie Nr. 162, Institute for Visualization and Interactive Systems, University of Stuttgart, 2012, pp. 1-77.
"A Global Display of Human Trafficking Incidents and News," Retrieved from http://human.globalincidentmap.com/, on Jul. 22, 2016, pp. 1-10.
"Live Incident Status," Lancaster County-Wide communications, Retrieved from http://www.lcwc911.us/lcwc/LiveStatus/LivelncidentList_aspx, on Jul. 22, 2016, pp. 1-2.
"AA Traffic News," Retrieved From http://www.theaa.com/traffic-news/index.jsp, on Jul. 22, 2016, pp. 1-2.
Martinez, "Timeline: What happened in Paris attacks," CNN, Nov. 2015, Retrieved from http://www.cnn.com/2015/11/14/world/what-happened-in-paris-attacks-timeline/, on Jul. 22, 2016, pp. 1-5.

* cited by examiner

REAL-TIME DYNAMIC VISUAL AID IMPLEMENTATION BASED ON CONTEXT OBTAINED FROM HETEROGENEOUS SOURCES

BACKGROUND

The present invention relates to visual aids, and more specifically, to dynamically providing visual aids in real time based on context obtained from heterogeneous sources.

Visual aids have the power to greatly enhance presentations, speeches, reports, and any other information conveyance mechanism that is similarly and primarily audio-based. From a speaker's standpoint, a presentation with appropriate visual aid may be much more impactful than a presentation without visual aid. Moreover, the audience may view the speaker as having more credibility and be more persuaded by the speaker's influence and opinion than an audience that is subjected to the presentation without visual aid. Also, visual aid increases audience interest, focuses the audience's attention on key points of the presentation, and aids retention of key points and content. Moreover, presented words with related live images may directly appeal to the audience's imagination and are easily digested in order to obtain relevant information (when, where, what) during the presentation.

The audience routinely expects real-time visual aid when watching news media. TV news broadcasts and newspapers typically provide visual aids in addition to information content with the visual aids possibly including location, time stamp, time line, and background information for enriching the information content. However, such visual aids are not available for live news reports due to the inability to dynamically generate such visual aids, particularly in response to on-demand access by the news content consumer.

SUMMARY

In one embodiment, a system includes a processing circuit and logic integrated with the processing circuit, executable by the processing circuit, or integrated with and executable by the processing circuit. The logic is configured to cause the processing circuit to extract one or more keywords from summarized content according to one or more classified topics. The logic is also configured to cause the processing circuit to search for visual aid elements that relate to the one or more keywords in a visual aid element repository that stores a plurality of visual aid elements. Moreover, the logic is configured to cause the processing circuit to select one or more visual aid elements from the visual aid element repository based on a type of the one or more classified topics. In addition, the logic is configured to cause the processing circuit to generate at least one visual aid object using the one or more visual aid elements based on at least one predefined visual aid template. Also, the logic is configured to cause the processing circuit to deliver the at least one visual aid object to one or more registered devices of at least one user.

In another embodiment, a computer program product includes a computer readable storage medium having program instructions embodied therewith. The embodied program instructions are executable by a processing circuit to cause the processing circuit to extract, by the processing circuit, one or more keywords from summarized content according to one or more classified topics. The embodied program instructions are also executable by the processing circuit to cause the processing circuit to search, by the processing circuit, for visual aid elements that relate to the one or more keywords in a visual aid element repository that stores a plurality of visual aid elements. Moreover, the embodied program instructions are executable by the processing circuit to cause the processing circuit to select, by the processing circuit, one or more visual aid elements from the visual aid element repository based on a type of the one or more classified topics. Also, the embodied program instructions are executable by the processing circuit to cause the processing circuit to generate, by the processing circuit, at least one visual aid object using the one or more visual aid elements based on at least one predefined visual aid template. Moreover, the embodied program instructions are executable by the processing circuit to cause the processing circuit to deliver, by the processing circuit, the at least one visual aid object to one or more registered devices of at least one user.

In another embodiment, a computer-implemented method includes extracting one or more keywords from summarized content according to one or more classified topics. The method also includes searching for visual aid elements that relate to the one or more keywords in a visual aid element repository that stores a plurality of visual aid elements. In addition, the method includes selecting one or more visual aid elements from the visual aid element repository based on a type of the one or more classified topics. Also, the method includes generating at least one visual aid object using the one or more visual aid elements based on at least one predefined visual aid template. Moreover, the method includes delivering the at least one visual aid object to one or more registered devices of at least one user.

Other aspects and embodiments of the present invention will become apparent from the following detailed description, which, when taken in conjunction with the drawings, illustrate by way of example the principles of the invention.

DETAILED DESCRIPTION

Figure 1:
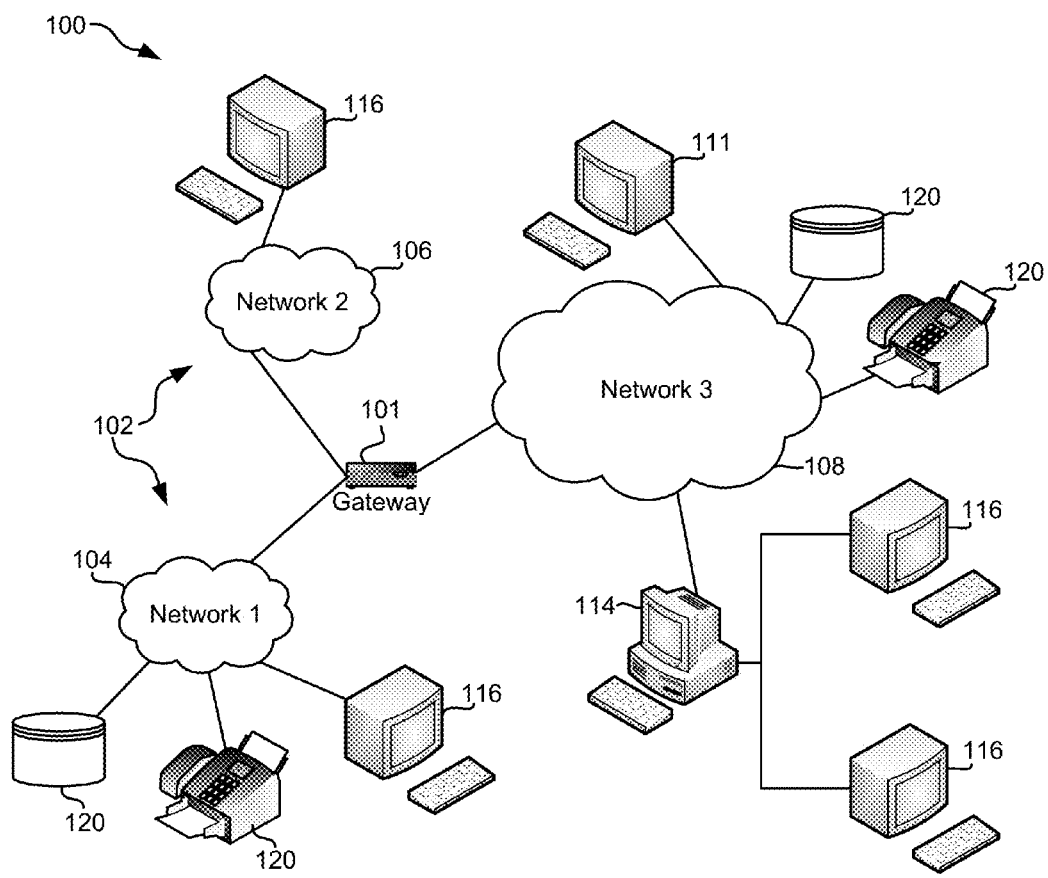
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about" ±10% of the value. For example, "about 10" indicates all values from and including 9.0 to 11.0.

The following description discloses several preferred embodiments of systems, methods, and computer program products for real-time dynamic visual aid implementation based on context from heterogeneous resources.

In one general embodiment, a system includes a processing circuit and logic integrated with the processing circuit, executable by the processing circuit, or integrated with and executable by the processing circuit. The logic is configured to cause the processing circuit to extract one or more keywords from summarized content according to one or more classified topics. The logic is also configured to cause the processing circuit to search for visual aid elements that relate to the one or more keywords in a visual aid element repository that stores a plurality of visual aid elements. Moreover, the logic is configured to cause the processing circuit to select one or more visual aid elements from the visual aid element repository based on a type of the one or more classified topics. In addition, the logic is configured to cause the processing circuit to generate at least one visual aid object using the one or more visual aid elements based on at least one predefined visual aid template. Also, the logic is configured to cause the processing circuit to deliver the at least one visual aid object to one or more registered devices of at least one user.

In another general embodiment, a computer program product includes a computer readable storage medium having program instructions embodied therewith. The embodied program instructions are executable by a processing circuit to cause the processing circuit to extract, by the processing circuit, one or more keywords from summarized content according to one or more classified topics. The embodied program instructions are also executable by the processing circuit to cause the processing circuit to search, by the processing circuit, for visual aid elements that relate to the one or more keywords in a visual aid element repository that stores a plurality of visual aid elements. Moreover, the embodied program instructions are executable by the processing circuit to cause the processing circuit to select, by the processing circuit, one or more visual aid elements from the visual aid element repository based on a type of the one or more classified topics. Also, the embodied program instructions are executable by the processing circuit to cause the processing circuit to generate, by the processing circuit, at least one visual aid object using the one or more visual aid elements based on at least one predefined visual aid template. Moreover, the embodied program instructions are executable by the processing circuit to cause the processing circuit to deliver, by the processing circuit, the at least one visual aid object to one or more registered devices of at least one user.

In yet another general embodiment, a computer-implemented method includes extracting one or more keywords from summarized content according to one or more classified topics. The method also includes searching for visual aid elements that relate to the one or more keywords in a visual aid element repository that stores a plurality of visual aid elements. In addition, the method includes selecting one or more visual aid elements from the visual aid element repository based on a type of the one or more classified topics. Also, the method includes generating at least one visual aid object using the one or more visual aid elements based on at least one predefined visual aid template. Moreover, the method includes delivering the at least one visual aid object to one or more registered devices of at least one user.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
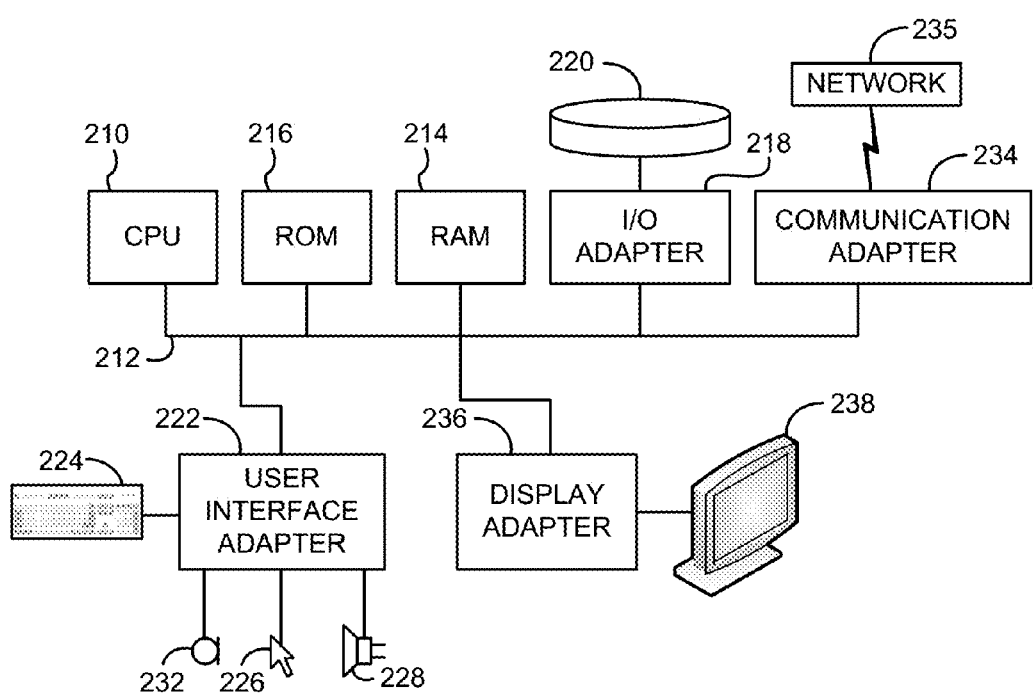
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
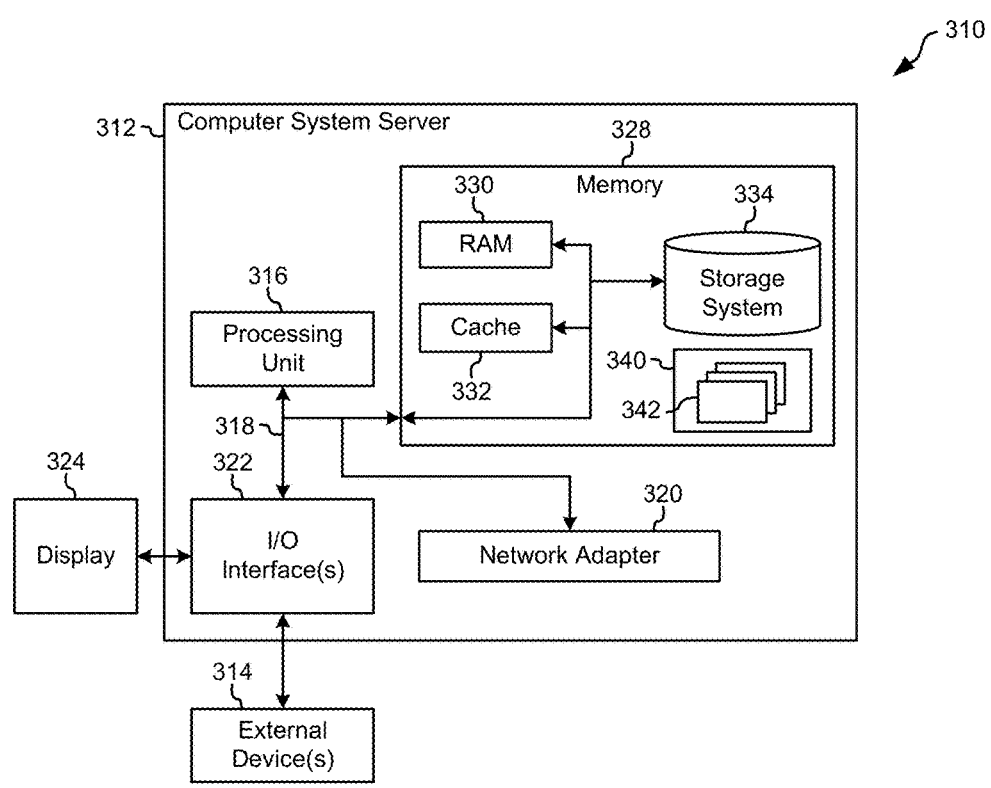
FIG. 3 depicts a cloud computing node according to one embodiment.

Referring now to FIG. 3, a schematic of an example of a cloud computing node is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to the one or more processors or processing units 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
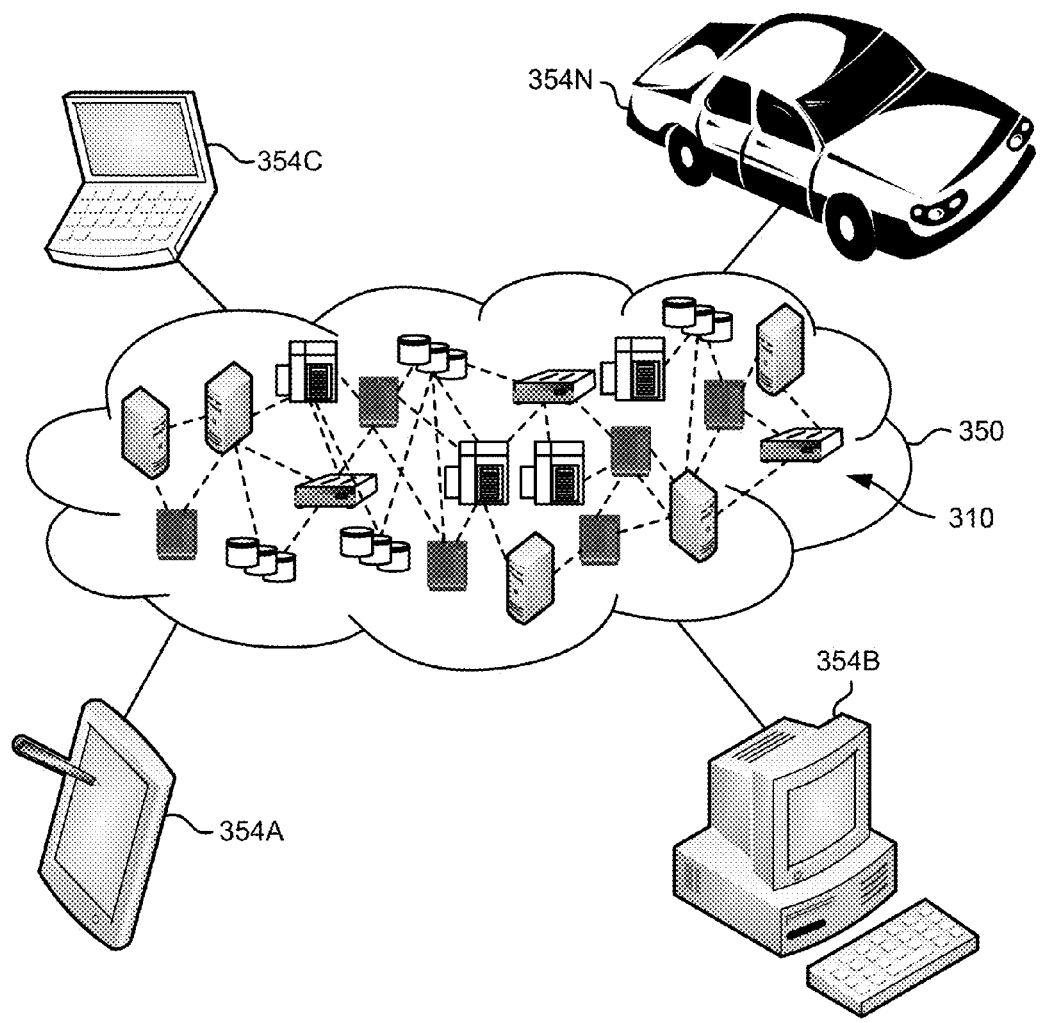
FIG. 4 depicts a cloud computing environment according to one embodiment.

Referring now to FIG. 4, illustrative cloud computing environment 350 is depicted. As shown, cloud computing environment 350 includes one or more cloud computing nodes 310 with which local computing devices used by cloud consumers, such as, for example, personal digital assistant (PDA) or cellular telephone 354A, desktop computer 354B, laptop computer 354C, and/or automobile computer system 354N may communicate. Nodes 310 may communicate with one another. They may be grouped (not shown) physically or virtually, in one or more networks, such as Private, Community, Public, or Hybrid clouds as described hereinabove, or a combination thereof. This allows cloud computing environment 350 to offer infrastructure, platforms and/or software as services for which a cloud consumer does not need to maintain resources on a local computing device. It is understood that the types of computing devices 354A-N shown in FIG. 4 are intended to be illustrative only and that computing nodes 310 and cloud computing environment 350 can communicate with any type of computerized device over any type of network and/or network addressable connection (e.g., using a web browser).

Figure 5:
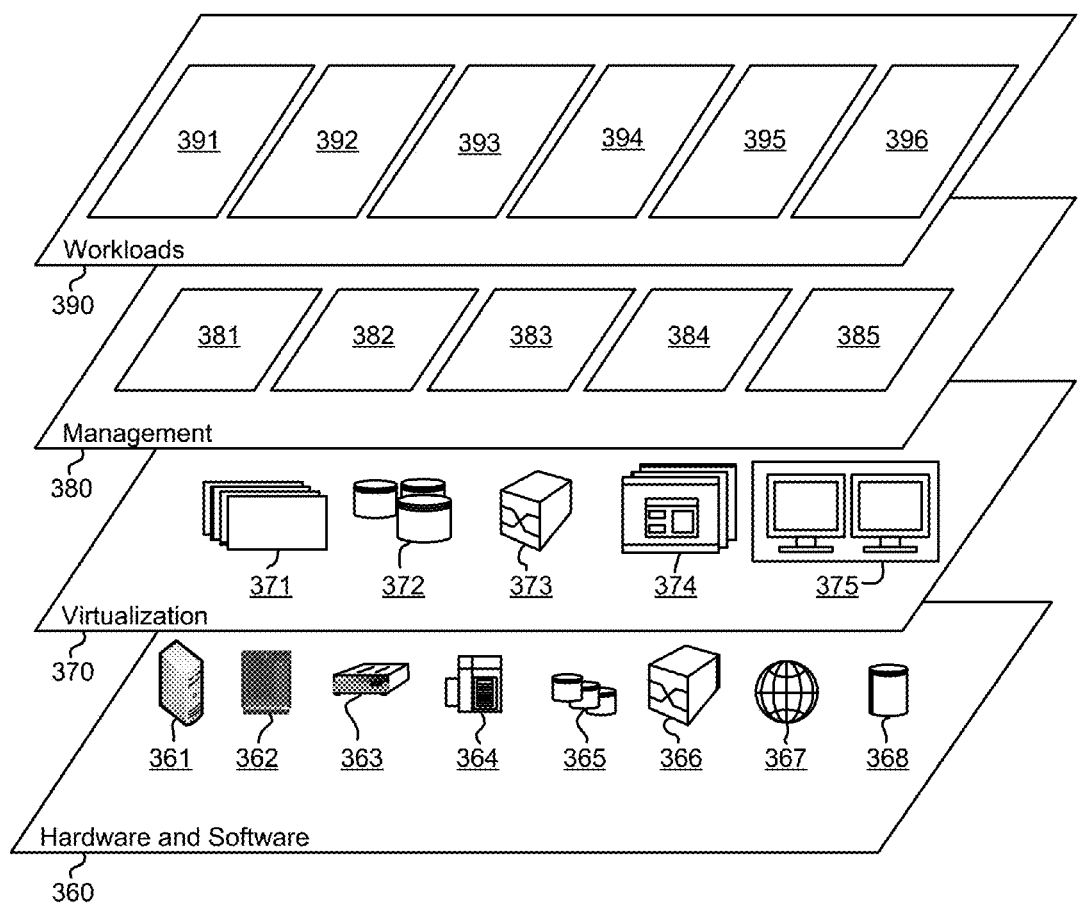
FIG. 5 depicts abstraction model layers according to one embodiment.

Referring now to FIG. 5, a set of functional abstraction layers provided by cloud computing environment 350 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities may be provided: virtual servers 371; virtual storage 372; virtual networks 373, including virtual private networks; virtual applications and operating systems 374; and virtual clients 375.

In one example, management layer 380 may provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment may be utilized. Examples of workloads and functions which may be provided from this layer include: mapping and navigation 391; software development and lifecycle management 392; virtual classroom education delivery 393; data analytics processing 394; transaction processing 395; and dynamic visual aid generation and delivery 396.

Visual aids that are typically used in presentations of information are pre-edited by the speaker, presenter, channel, etc., (collectively referred to herein as "information provider"). Therefore, the listener, observer, content user (collectively referred to herein as "audience") is only allowed to obtain a pre-edited visual aid which includes information that may be outdated or no longer relevant in the real-time consumption of the presentation. For example, on a typical TV news program, visual aids related to locations (which may include city name, street names, street addresses, etc.), time-lines (which graphically depict timing for two or more events which have already taken place or might take place in the future), and background information (which provides context for the story being discussed) are pre-edited by a news editor team to ensure compliance with standards and accuracy of the information, among other reasons.

However, currently there are no methods available to dynamically aggregate, generate, and deliver correlated and focused visual aids for helping the audience to better comprehend a presentation, such as news reports or events in real time. Accordingly, described herein in accordance with several embodiments are novel techniques to proactively provide real-time visual aid(s) to the audience.

In illustrative embodiments, a method of proactive real-time visual assistance on a primary or secondary device is described for helping the audience comprehend the content of the presentation. The presentation may comprise a speech observed visually and audibly in person, on TV, over the internet, etc.; a speech, report, dialog, or conference observed audibly in person, via radio, over the internet, etc.; a news report observed on TV, over the internet, etc.; emergency situation directives and instructions (such as evacuation plans, emergency detours, etc.) observed visually, audibly, or textually; memos or directives provided by an employer, educational institution, the government, etc., observed textually or graphically via email, text, over the internet, etc.; or some other presentation type known in the art that is observed or experienced by an audience in some way.

In order to provide the real-time dynamic context analysis-based visual aids, several actions are performed by one or more devices, systems, and/or program instructions. These actions include, but are not limited to, the following actions:

1) monitoring outputs of at least one content source (e.g., an in-person speaker, a radio, a TV, a computer monitor, a stream from the internet, etc.), such as by a primary device, to obtain unstructured or informally structured content from one or more heterogeneous resources.

2) summarizing key topics of the content.

3) classifying the summarized key topics.

4) extracting keywords according to one or more classified topics.

5) searching correlated elements related to the extracted keywords. These elements may comprise global positioning satellite (GPS) sources; maps including country, province or state, county, city, and street names; addresses; listings of businesses, stores, residents, etc., in proximity to the addresses; names of people and events related to the content; photos related to the content; important people related to the content, etc., which may be obtained from one or more local and/or remote repositories.

6) identifying one or more suitable elements according a type of the classified topic.

7) generating at least one visual aid object using the one or more elements (e.g., two-dimensional image, three-dimensional image, listing of keywords, map, relevant photos, relevant videos, etc.) based on one or more predefined templates.

8) determining one or more visual aid requesters associated with one or more registered devices (e.g., a primary device such as a TV, computer monitor, smartphone, tablet, etc., one or more secondary devices such as TVs, computer monitors, smartphones, PDAs, tablets, projectors, touchscreens, etc.).

9) delivering the generated visual aid object(s) to the one or more registered devices.

10) rendering the delivered visual aid object(s) using the one or more registered devices.

Figure 6:
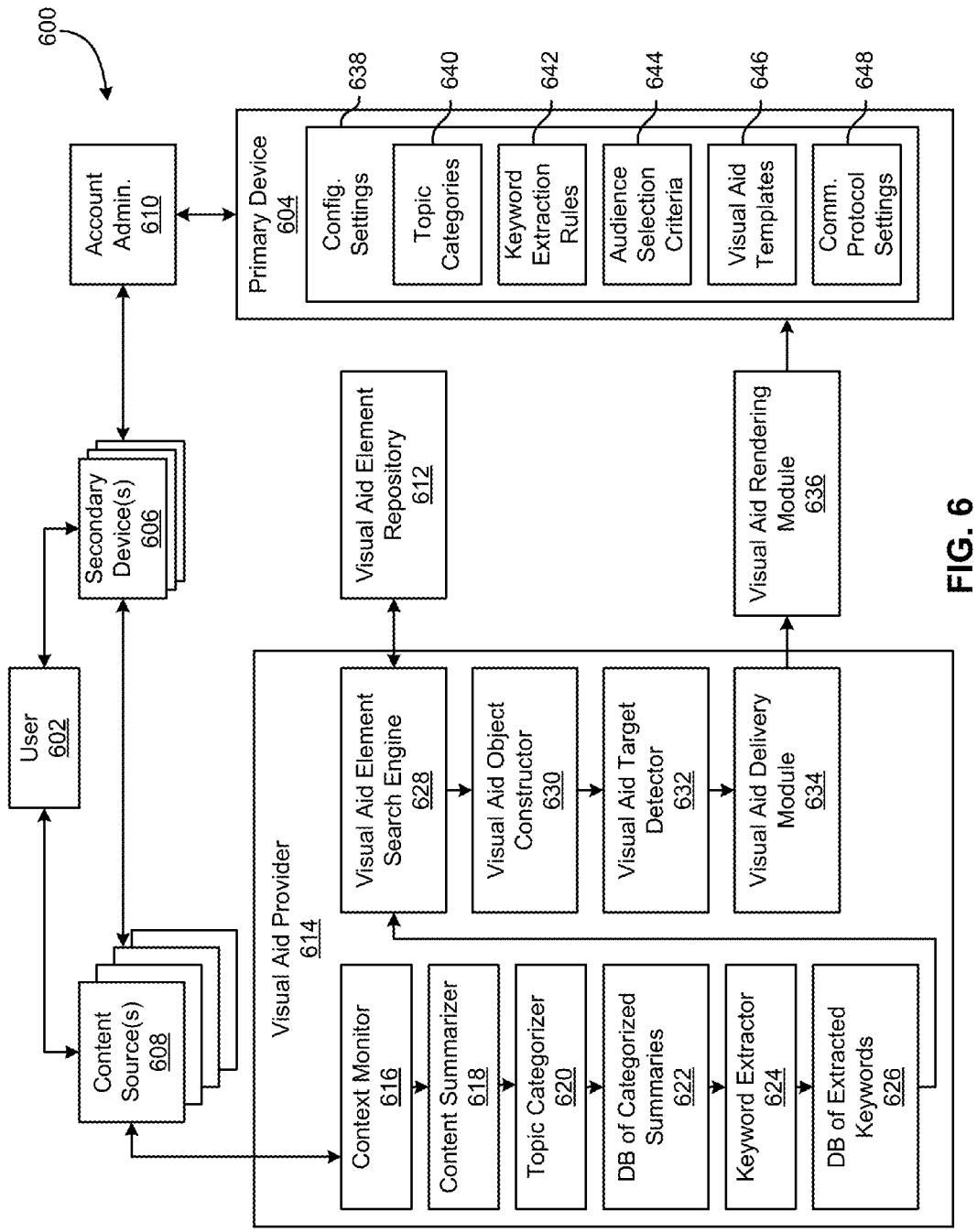
FIG. 6 shows a system according to one embodiment.

Now referring to FIG. 6, a block diagram of a system 600 is shown according to one embodiment. The system 600 may include some or all of a user 602, a primary device 604, one or more secondary devices 606, a visual aid provider 614, and at least one content source 608. The system 600 may further include, in some embodiments, an account administrator 610, and at least one visual aid element repository 612.

As shown in FIG. 6, a user 602 observes a presentation provided by at least one content source 608. The primary device 604, and/or one or more secondary devices 606 may be used to observe the presentation provided by the at least one content source 608 in various embodiments. However, no device needs to be used, as some content sources are observable without the aid of a device, such as a speech, convention, etc.

The user 602 is a member of an audience for the presentation. In some cases, there may only be one user in the audience. In other cases, the audience may comprise millions and millions of people and/or devices (users), and anywhere in between.

The primary device 604 may be any device suitable for providing the presentation, such as a TV, a handheld electronic transceiver device, a smartphone, a radio, a satellite radio transceiver, a tablet, a laptop, a Bluetooth headset, a computer connected wirelessly and/or wired to the Internet, etc. In a further embodiment, the primary device 604 may be capable of providing the visual aid(s).

The secondary devices 606 may be of any type suitable for providing the presentation, such as a TV, a handheld electronic transceiver device, a smartphone, a radio, a satellite radio transceiver, a tablet, a laptop, a Bluetooth headset, a computer connected wirelessly and/or wired to the Internet, etc. In a further embodiment, the at least one secondary devices 606 may each be capable of providing the visual aid(s).

The user 602 interacts with the primary device 604 or some other device for observing the presentation, in one embodiment, in order to initiate the generation of the visual aid(s). The interaction may be any action suitable to indicate observation of the presentation, such as tuning to a particular channel on a TV (or via a set-top box, router, or switch) broadcasting the presentation, navigating to a particular website on a computer connected to the Internet that is displaying or otherwise relaying the presentation, pressing a button, flipping a switch, speaking an audible command to start the presentation, tuning a radio to a particular radio station broadcasting the presentation, a GPS signal indicating proximity to a live presentation, etc.

The content sources 608 may be any type of content source known in the art from which a presentation may be obtained, such as a live speaker, presenter, convention, gathering, etc., a TV news broadcast, a radio news broadcast, a web news story, etc., a weblog or blog, a video-blog or vlog, etc.

The account administrator 610 is an autonomous process or human administrator that is charged with ensuring that user devices are registered properly, that visual aid objects are delivered appropriately, that users are authorized proper rights in the system 600, etc.

The visual aid provider 614, in one embodiment, includes some or all of the following components: a context monitor 616, a content summarizer 618, a topic categorizer 620, a database of categorized summaries 622, a keyword extractor 624, a database of extracted keywords 626, a visual aid element search engine 628, a visual aid object constructor 630, a visual aid target detector 632, a visual aid delivery module 634, and a visual aid rendering module 636.

The context monitor 616 is configured to monitor outputs of one or more of the content sources 608. The outputs of the content sources 608 are used as input of raw data having the presentation therein for generation of visual aid(s). The context monitor 616 may be implemented as a hardware module, software module, or program instructions executable by a processing circuit to monitor outputs of one or more of the content sources 608.

The content summarizer 618 is configured to summarize and highlight at least one key topic of the presentation provided in the monitored outputs of the one or more content sources 608. The summarized materials including one or more key topics may be stored as a plain text document, a tabulated format, a comma separated list, or in any other format suitable for use in the analysis that follows. The content summarizer 618 may be implemented as a hardware module, software module, or program instructions executable by a processing circuit to summarize and highlight at least one key topic of the presentation provided in the monitored outputs of the one or more content sources 608.

The topic categorizer 620 is configured to classify the one or more key topics into individual categories. Each individual category may be provided with one or more different visual elements that may server different purposes in broadening the understanding of the key topic. For example, both criminal news reports and a real estate advertisement may benefit from specific location visual aid elements, but the key elements and weights of each individual visual aid element may be different from the criminal news report and the real estate advertisement in generation of the associated visual aid objects.

The database of categorized summaries 622 is configured to store the various categorized key topics from the topic categorizer 620. The database of categorized summaries 622 may take any suitable form known in the art, and may be accessible to the topic categorizer 620 and the keyword extractor 624.

The keyword extractor 624 is configured to filter and collect useful keywords (such GPS, map elements, street/location/store names, events, photos, people) from the summarized materials according to a set of predefined keyword extraction rules. The predefined keyword extraction rules may be created and modified via a profile of configuration settings on the device used to observe the presentation.

The visual aid element search engine 628 is a module or application programming interface (API) configured to identify suitable visual aid elements for use in the visual aid(s) according to a type of the classified topic. These visual aid elements are selected from one or more visual aid element repositories 612.

The one or more visual aid element repositories 612 comprise one or more databases that store visual aid elements. The visual aid elements in the one or more visual aid element repositories 612 may take any usable form, such as GPS data and rendered maps, location names, images, videos, audio clips, text documents, social media posts, relevant people, relevant places, neighborhood data, etc.

The visual aid elements may be collected from any available source, such as the Internet, TV broadcasts, radio broadcasts, social media such as TWITTER, FACEBOOK, INSTAGRAM, etc., libraries, etc.

The visual aid object constructor 630 is a module or API configured to compose a visual aid object (such as a 2-D image, 3-D image, text linked to additional content, an active icon that when clicked links to additional content, images, videos, audio clips, text, etc.) that may include borders, colors, headings, and any other elements that aid in the presentation of the visual aid object to increase the ease in which the user may interpret the information provided in the visual aid object. The visual aid object may be static, dynamic, or interactive in which the user is allowed to manipulate the visual aid object to adjust for clarity, to gain additional understanding, etc.

One or more predefined visual aid templates may be used by the visual aid object constructor 630 to construct consistent and reliable visual aid objects according to one embodiment. These visual aid templates, which are stored in configuration settings 638.

The visual aid target detector 632 is a module or API configured to determine visual aid requesters (e.g., users and registered devices accessible to the users). In order to provide dynamic visual aid services, some biometric sensor techniques may be used to determine which users might benefit from a visual aid in real time. For example, a user exhibiting a confused face in view of a smartphone camera may trigger a visual aid object to be delivered to the smartphone in a sub-window to the content currently being viewed by the user. Other ques may be used to determine desired visual aid generation, such as audible or textual queries for help, tapping a button, clicking a link, etc.

The visual aid delivery module 634 is a module or API configured to deliver the constructed visual aid object to the user device indicated to receive the visual aid object, which may be the primary device 604 or one or more secondary devices 606 that is selected by the visual aid target detector 632.

The visual aid rendering module 636 is configured to display, render, or otherwise output the delivered visual aid objects on the selected user device (which is a registered device or devices according to the visual aid target detector 632).

In one embodiment, the visual aid rendering module 636 may be located on the user device on which the visual aid object will be displayed, such as the primary device 604, one or more secondary devices 606, etc. In another embodiment, the visual aid rendering module 636 may be a part of the visual aid provider 614.

The primary device 604 or some other suitable device, system, program instructions executing on a device, etc., may further include information useful in generating the visual aid(s) including configuration settings 638, in one embodiment. In other embodiments, some or all of the configuration settings 638 may be stored on a client-side server, host, or some other system or device configured to provide the information on demand to help in the generation of the visual aid(s).

The configuration settings 638 are a profile that helps in the configuration of the visual aid elements used in the visual aid(s). The configuration settings 638 may comprise predefined types of categories used in topic categorization 640, predefined keyword extraction rules 642, audience selection criteria 644 which may include types of usable devices, and visual aid templates 646 which may include visual aid delivery priority, communication protocol settings 648, etc.

By implementing the dynamic visual aid services described herein in various embodiments, more flexible and reliable visual aids may be provided to those who desire them allowing for greater understanding of situations. Moreover, better performance and less cost to provide the visual aid services is possible using the described techniques. In addition, there is a possibility to obtain more data for improving current cognitive systems.

Figure 7:
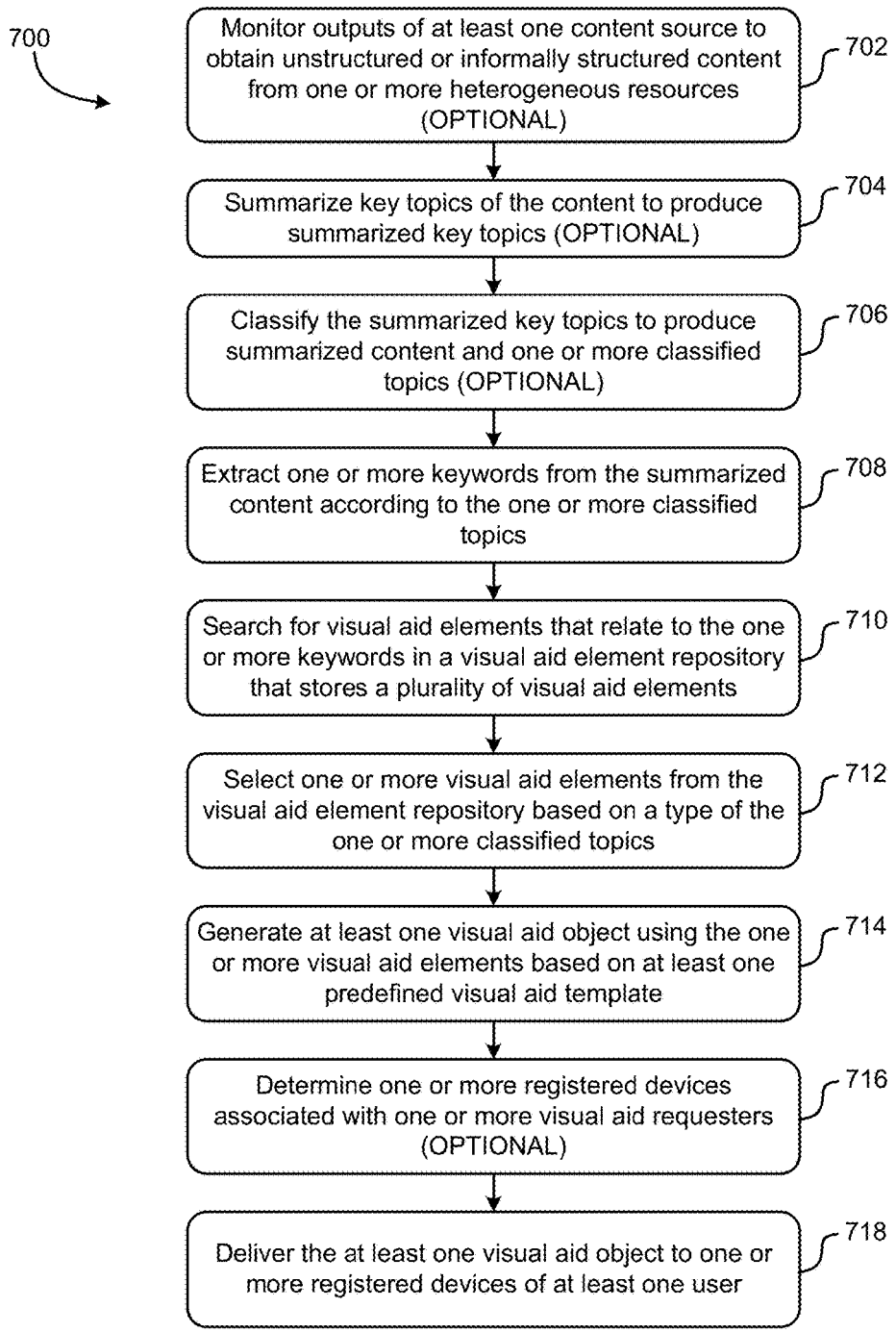
FIG. 7 shows a flowchart of a method, according to one embodiment.

Now referring to FIG. 7, a method 700 is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a server, a host, a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 700. Illustrative processors include, but are not limited to, a CPU, an ASIC, a FPGA, etc., combinations thereof, or any other suitable computing device known in the art.

As shown in FIG. 7, method 700 may start with optional operation 702, where outputs of at least one content source (e.g., an in-person speaker, a radio broadcast, a TV broadcast, a computer monitor displaying information, a stream from the internet, etc.) are monitored to obtain unstructured or informally structured content from one or more heterogeneous resources. In one embodiment, the outputs may be monitored using a primary device (e.g., a smartphone, TV, laptop computer, etc.) that is accessing the content source (e.g., a laptop accessing a stream of a news broadcast over the Internet, a wearable micro-transceiver that records a news radio broadcast that is within hearing distance from the wearable micro-transceiver, a TV or set-top box accessing content from one of hundreds of channels of content provided by a cable service, satellite service, etc.), and/or in a proximity to the content source in order to obtain the content produced by the content source (e.g., a presentation delivered by an in-person speaker that is recorded using a microphone of the primary device).

In optional operation 704, key topics of the content are summarized to produce summarized key topics. Any known method or system capable of summarizing the content may be used. For example, long portions of monologues may be summarized into a few pertinent sentences or phrases, such as using a first and last sentence of each paragraph, or some other logical analysis that obtains a summarization of the presentation. In another example, a new report about jail overcrowding may list overcrowded jails and locations which may be summarized, while any mention of conditions facing the inmates may be skipped as it is not pertinent to the overcrowding and locations of overcrowded jails.

In optional operation 706, the summarized key topics are classified to produce summarized content and one or more classified topics. The classification may be based on one or more predefined topic classifications, such as geographical content, content pertaining to a person or people, content pertaining to a place or places, content pertaining to an event or events in the past, content pertaining to a current event or events, etc.

In operation 708, one or more keywords are extracted from the summarized content according to the one or more classified topics. For example, keywords like war, drugs, corporate names, people names, location names, addresses, dates, times, etc., may be extracted from the summarized content.

In operation 710, visual aid elements that relate to the one or more keywords are searched for in a visual aid element repository that stores a plurality of visual aid elements.

In one embodiment, the visual aid elements may include any of the following types of visual aid elements: GPS images and/or data, maps, addresses, businesses, stores, and residents in proximity to the addresses, names of people and events related to the summarized content, photos related to the summarized content, and videos related to the summarized content.

In operation 712, one or more visual aid elements are selected from the visual aid element repository based on a type of the one or more classified topics. For example, for a classified topic of geographical content, GPS images or data or a map may be selected as a visual aid element.

In operation 714, at least one visual aid object is generated using the one or more visual aid elements based on at least one predefined visual aid template.

In one embodiment, the at least one predefined visual aid template may be selected from a plurality of predefined visual aid templates stored in a visual aid template database. The visual aid template database may include user-defined visual aid templates, vendor-provided visual aid templates, stock visual aid templates, etc. In one embodiment, at least one visual aid object may be selected from the following: a two-dimensional image, a three-dimensional image, a listing of keywords, a map, a relevant photo, and a relevant video. In this way, production of visual aids is faster and requires less processing power, and therefore the user is able to obtain the visual aid object more expediently to aid in the understanding of the presentation.

In another embodiment, the one or more visual aid elements may be modified to display information relevant to the summarized content prior to being used to generate the visual aid object, would be understood by one of skill in the art. For example, a map element may be populated with details from the location of a news report, a list may be populated with keywords for a speech, evacuation orders may be updated to reflect current and ever-changing dangers along evacuation routes, etc.

In optional operation 716, one or more registered devices associated with one or more visual aid requesters is determined (prior to delivering the at least one visual aid object to the one or more registered devices). This determination may be based on a user pre-registering one or more devices to an account, and the name, IP address, MAC address, etc., of the device being provided and stored for use in delivering the visual aid object(s). In a further embodiment, an application may be installed on each registered device that provides an interface with a cloud-based or remote server that is configured to render and deliver the visual aid object(s) to user devices via the installed application. In another embodiment, the cloud-based or remote server may be configured to utilize existing channels of communication to provide the visual aid object(s).

In operation 718, the at least one visual aid object is delivered to one or more registered devices of at least one user. Each user of the visual aid rendering services described herein may have one or more devices registered for receiving the generated visual aid objects. Therefore, based on the format of the visual aid object, and the circumstances and situation of the particular requesting user, one or more registered devices may be selected for delivering the at least one visual aid object for consumption by the user. For example, when listening to a speech, the user may have access to a registered smartphone on which the at least one visual aid object is delivered, but delivery to a home computer or TV would not be beneficial, and therefore may be skipped.

In another embodiment, all registered devices of a user have the at least one visual aid object delivered, and the user may select which device to view the at least one visual aid object on for ease of use.

In another embodiment, the one or more registered devices on which the at least one visual aid object is delivered may be different from a device on which the summarized content is obtained. For example, a user may be watching a news broadcast on a TV and may have a visual aid object delivered and displayed on a smartphone that he is also accessing. In another embodiment, a first TV may display a speech, while a second TV may display the dynamic visual aid object summarizing the speech, providing background on the speaker, rendering a map about a location the speaker is talking about, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A system, comprising:
a processing circuit; and
logic integrated with the processing circuit, executable by the processing circuit, or integrated with and executable by the processing circuit, the logic being configured to cause the processing circuit to:
monitor outputs of a plurality of content sources to obtain unstructured or informally structured content from a plurality of heterogeneous resources, the unstructured or informally structured content being acquired as it is produced live in real time;
extract one or more keywords in accordance with a set of predefined keyword extraction rules from summarized content of the unstructured or informally structured content that is summarized according to one or more classified topics;
search for visual aid elements that relate to the one or more keywords in a visual aid element repository that stores a plurality of visual aid elements;
select one or more visual aid elements from the visual aid element repository based on a type of the one or more classified topics;
modify the one or more visual aid elements to display information relevant to the summarized content;
generate at least one visual aid object using the one or more modified visual aid elements based on at least one predefined visual aid template;
detect that at least one user is observing content from a first resource of the plurality of heterogeneous resources; and
deliver the at least one visual aid object to one or more registered devices of at least one user in response to detection of the at least one user observing the unstructured or informally structured content, the at least one visual aid object being interactive for the at least one user.

2. The system as recited in claim 1, wherein the logic is further configured to cause the processing circuit to:
create the set of predefined keyword extraction rules via a profile of configuration settings; and
detect that the at least one user is observing the unstructured or informally structured content by detecting an action selected from a group consisting of: tuning to a particular channel that is broadcasting the unstructured or informally structured content, navigating to a particular website that is displaying the unstructured or informally structured content, speaking an audible command to start the unstructured or informally structured content, tuning a radio to a particular radio station broadcasting the unstructured or informally structured content, moving to a location that is in proximity to a source of the unstructured or informally structured content.

3. The system as recited in claim 1, wherein the logic is further configured to cause the processing circuit to:
summarize key topics of the content to produce summarized key topics; and
classify the summarized key topics to produce the summarized content.

4. The system as recited in claim 1, wherein the plurality of content sources are selected from a group comprising: an in-person speaker, a radio broadcast, a television (TV) broadcast, and an Internet data stream, and wherein the logic is further configured to cause the processing circuit to determine the one or more registered devices associated with one or more visual aid requesters prior to delivering the at least one visual aid object to the one or more registered devices.

5. The system as recited in claim 1, wherein the logic is further configured to cause the processing circuit to:
detect that the at least one user would benefit from provision of the at least one visual aid object using a biometric sensor,
wherein the at least one visual aid object is delivered to the one or more registered devices in further response to detection that the at least one user would benefit from provision of the at least one visual aid object.

6. The system as recited in claim 1, wherein the one or more visual aid elements are selected from the group consisting of:
global positioning satellite (GPS) images;
maps;
addresses; and
businesses, stores, and residents in proximity to the addresses.

7. The system as recited in claim 1, wherein the at least one predefined visual aid template is selected from a plurality of predefined visual aid templates stored in a visual aid template database, wherein at least one visual aid template stored to the visual aid template database is provided by a vendor, and wherein the at least one visual aid object is selected from the group consisting of:
a two-dimensional image;
a three-dimensional image;
a listing of keywords;
a map;
a relevant photo; and
a relevant video.

8. The system as recited in claim 1, wherein the one or more registered devices on which the at least one visual aid object is delivered are different from a device on which the summarized content is obtained, and wherein the type of the one or more classified topics is selected from the group consisting of: geographical content, content pertaining to one or more people, content pertaining to one or more places, content pertaining to one or more historical events, and content pertaining to one or more current events.

9. A computer program product, the computer program product comprising a computer readable storage medium having program instructions embodied therewith, the embodied program instructions being executable by a processing circuit to cause the processing circuit to:
extract, by the processing circuit, one or more keywords in accordance with a set of predefined keyword extraction rules from summarized content that is summarized according to one or more classified topics;
search, by the processing circuit, for visual aid elements that relate to the one or more keywords in a visual aid element repository that stores a plurality of visual aid elements;
select, by the processing circuit, one or more visual aid elements from the visual aid element repository based on a type of the one or more classified topics;
modify, by the processing circuit, the one or more visual aid elements to display information relevant to the summarized content;
generate, by the processing circuit, at least one visual aid object using the one or more modified visual aid elements based on at least one predefined visual aid template; and
deliver, by the processing circuit, the at least one visual aid object to one or more registered devices of at least one user, the at least one visual aid object being interactive for the at least one user.

10. The computer program product as recited in claim 9, wherein the embodied program instructions are further executable by the processing circuit to cause the processing circuit to:
monitor, by the processing circuit, outputs of at least one content source to obtain unstructured or informally structured content from one or more heterogeneous resources;
create, by the processing circuit, the set of predefined keyword extraction rules via a profile of configuration settings;
summarize, by the processing circuit, key topics of the content to produce summarized key topics; and
classify, by the processing circuit, the summarized key topics to produce summarized content.

11. The computer program product as recited in claim 10, wherein the at least one content source is selected from a group comprising: an in-person speaker, a radio broadcast, a television (TV) broadcast, and an Internet data stream, and wherein the embodied program instructions are further executable by the processing circuit to cause the processing circuit to:
determine, by the processing circuit, the one or more registered devices associated with one or more visual aid requesters prior to delivering the at least one visual aid object to the one or more registered devices; and
detect, by the processing circuit, that the at least one user would benefit from provision of the at least one visual aid object using a biometric sensor,
wherein the at least one visual aid object is delivered to the one or more registered devices in response to detection that the at least one user would benefit from provision of the at least one visual aid object and detection of the at least one user observing the unstructured or informally structured content.

12. The computer program product as recited in claim 9, wherein the embodied program instructions are further executable by the processing circuit to cause the processing circuit to:
determine, by the processing circuit, the one or more registered devices associated with one or more visual aid requesters prior to delivering the at least one visual aid object to the one or more registered devices.

13. The computer program product as recited in claim 9, wherein the one or more visual aid elements are selected from the group consisting of:
global positioning satellite (GPS) images;
maps;
addresses; and
businesses, stores, and residents in proximity to the addresses.

14. The computer program product as recited in claim 9, wherein the at least one predefined visual aid template is selected from a plurality of predefined visual aid templates stored in a visual aid template database, and wherein the at least one visual aid object is selected from the group consisting of:
a two-dimensional image;
a three-dimensional image;
a listing of keywords;
a map;
a relevant photo; and
a relevant video.

15. The computer program product as recited in claim 9, wherein the one or more registered devices on which the at least one visual aid object is delivered are different from a device on which the summarized content is obtained, and wherein the type of the one or more classified topics is selected from the group consisting of: geographical content, content pertaining to one or more people, content pertaining to one or more places, content pertaining to one or more historical events, and content pertaining to one or more current events.

16. A computer-implemented method, the method comprising:
extracting one or more keywords in accordance with a set of predefined keyword extraction rules from summarized content that is summarized according to one or more classified topics;
searching for visual aid elements that relate to the one or more keywords in a visual aid element repository that stores a plurality of visual aid elements;
selecting one or more visual aid elements from the visual aid element repository based on a type of the one or more classified topics;
modifying the one or more visual aid elements to display information relevant to the summarized content;
generating at least one visual aid object using the one or more modified visual aid elements based on at least one predefined visual aid template; and
delivering the at least one visual aid object to one or more registered devices of at least one user, the at least one visual aid object being interactive for the at least one user.

17. The method as recited in claim 16, further comprising:
monitoring outputs of at least one content source to obtain unstructured or informally structured content from one or more heterogeneous resources;
creating the set of predefined keyword extraction rules via a profile of configuration settings;
summarizing key topics of the content to produce summarized key topics;
classifying the summarized key topics to produce summarized content; and
determining the one or more registered devices associated with one or more visual aid requesters prior to delivering the at least one visual aid object to the one or more registered devices,
wherein the at least one content source is selected from the group consisting of: a radio broadcast, a television (TV) broadcast, and an Internet data stream.

18. The method as recited in claim 16, wherein the one or more visual aid elements are selected from the group consisting of:
global positioning satellite (GPS) images;
maps;
addresses; and
businesses, stores, and residents in proximity to the addresses.

19. The method as recited in claim 16, wherein the at least one predefined visual aid template is selected from a plurality of predefined visual aid templates stored in a visual aid template database, and wherein the at least one visual aid object is selected from the group consisting of: a two-dimensional image, a three-dimensional image, a listing of keywords, a map, a relevant photo, and a relevant video.

20. The method as recited in claim 16, wherein the one or more registered devices on which the at least one visual aid object is delivered are different from a device on which the summarized content is obtained, and wherein the type of the one or more classified topics is selected from the group consisting of: geographical content, content pertaining to one or more people, content pertaining to one or more places, content pertaining to one or more historical events, and content pertaining to one or more current events.

* * * * *